(12) United States Patent
Oki et al.

(10) Patent No.: US 10,036,844 B2
(45) Date of Patent: Jul. 31, 2018

(54) SURFACE LIGHT SOURCE DEVICE AND PRISM SHEET

(71) Applicant: STANLEY ELECTRIC CO., LTD., Meguro-ku, Tokyo (JP)

(72) Inventors: Yoji Oki, Tokyo (JP); Kazumi Chijiwa, Tokyo (JP)

(73) Assignee: STANLEY ELECTRIC CO., LTD., Tokyo (JP)

( * ) Notice: Subject to any disclaimer, the term of this patent is extended or adjusted under 35 U.S.C. 154(b) by 224 days.

(21) Appl. No.: 15/209,805

(22) Filed: Jul. 14, 2016

(65) Prior Publication Data

US 2017/0023725 A1 Jan. 26, 2017

(30) Foreign Application Priority Data

Jul. 23, 2015 (JP) ................................. 2015-145843

(51) Int. Cl.
*F21V 8/00* (2006.01)

(52) U.S. Cl.
CPC ......... *G02B 6/0053* (2013.01); *G02B 6/0038* (2013.01); *G02B 6/0068* (2013.01)

(58) Field of Classification Search
USPC ........................................................ 362/606
See application file for complete search history.

(56) References Cited

U.S. PATENT DOCUMENTS

| 5,999,685 | A  | * | 12/1999 | Goto | G02B 6/0038 349/65 |
| 6,273,577 | B1 | * | 8/2001  | Goto | F21S 19/00 349/65 |
| 8,436,960 | B2 | * | 5/2013  | Teragawa | G02B 5/045 349/62 |
| 2006/0291243 | A1 | * | 12/2006 | Niioka | G02B 3/08 362/607 |
| 2010/0123854 | A1 | * | 5/2010  | Adachi | F21V 7/04 349/61 |

FOREIGN PATENT DOCUMENTS

JP 5254658 B2 8/2013

* cited by examiner

*Primary Examiner* — Michael G Lee
*Assistant Examiner* — David Tardif
(74) *Attorney, Agent, or Firm* — Holtz, Holtz & Volek PC

(57) ABSTRACT

A surface light source device 100 comprises light sources 10 and 20, a light guide plate 30, and a prism sheet 40. A plurality of ridges 41 are formed on the incident surface of the prism sheet 40. Each ridge 41 includes first and second inclined surfaces 41a and 41b whose inclination angles with respect to a normal line 45a are A1 and A2, respectively, provided that $35.5° \leq A1 \leq 39°$ and $23° \leq A2 \leq 30°$.

8 Claims, 8 Drawing Sheets

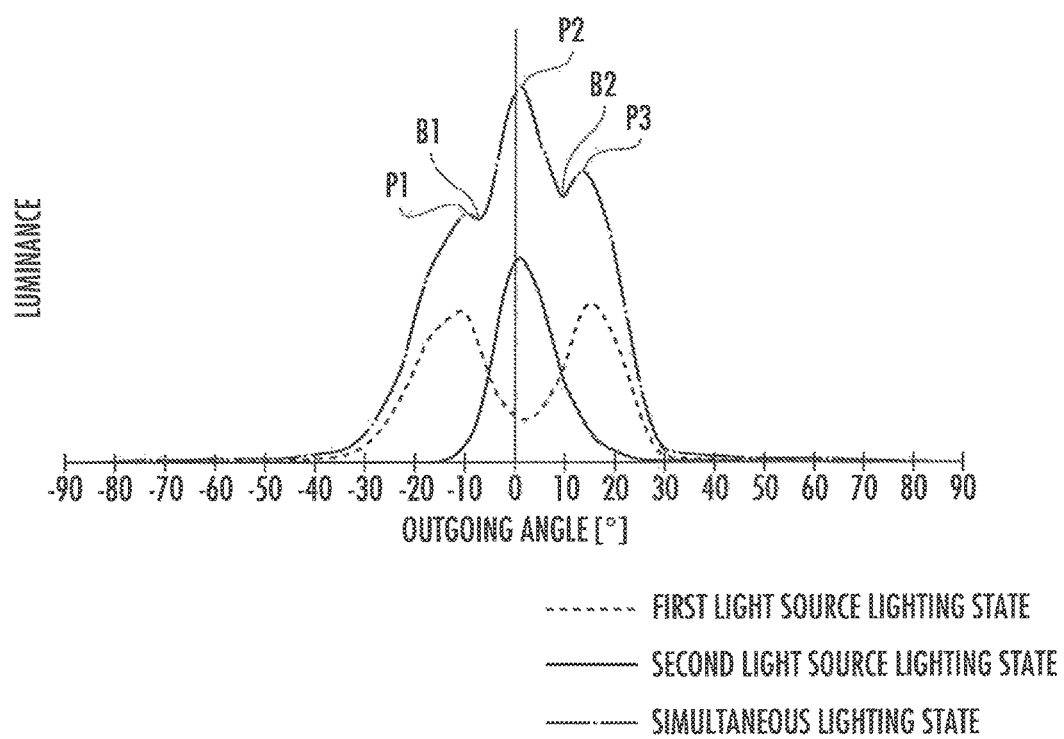

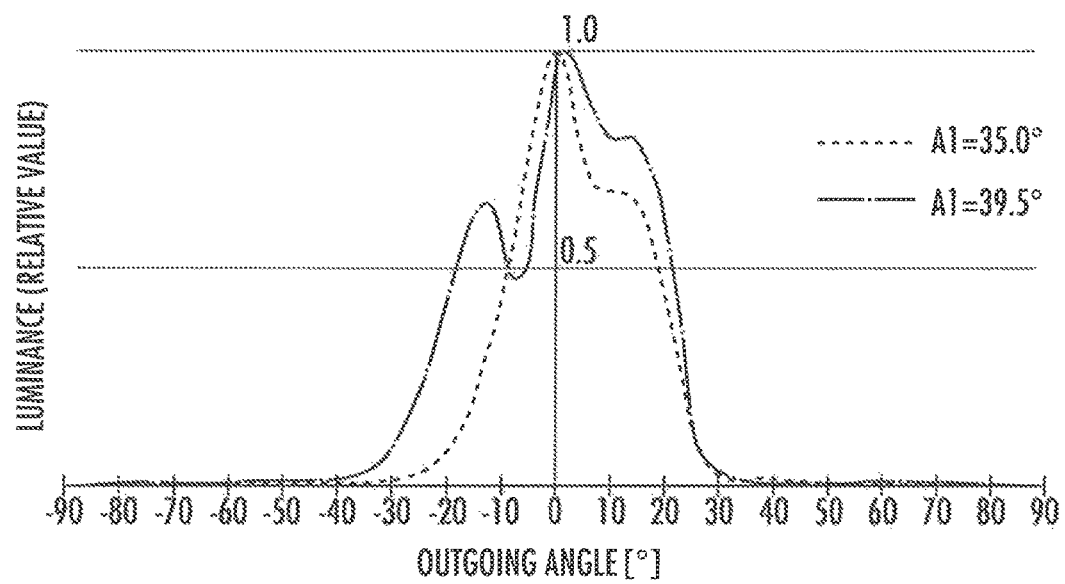
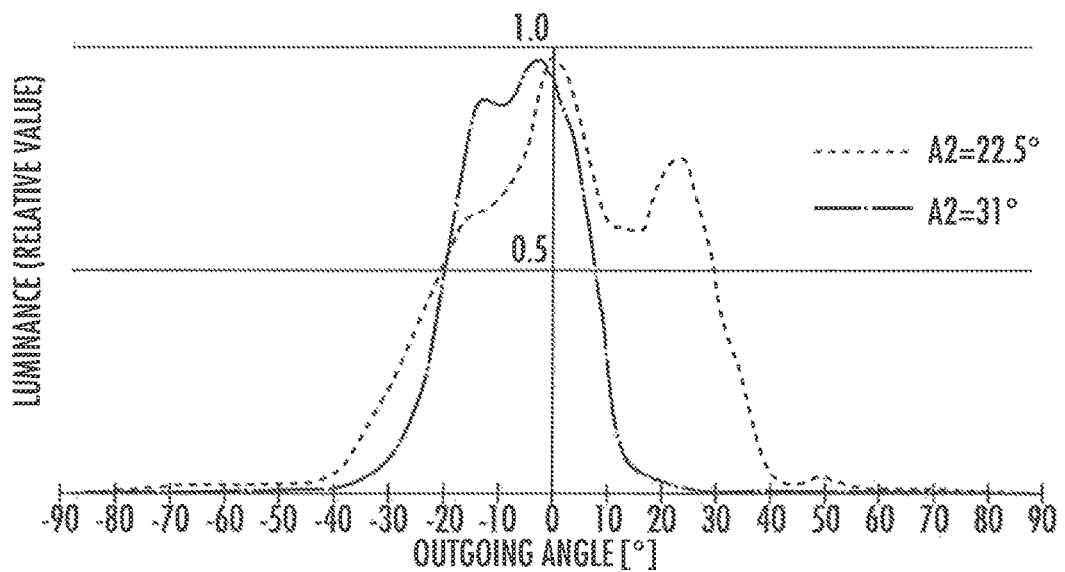

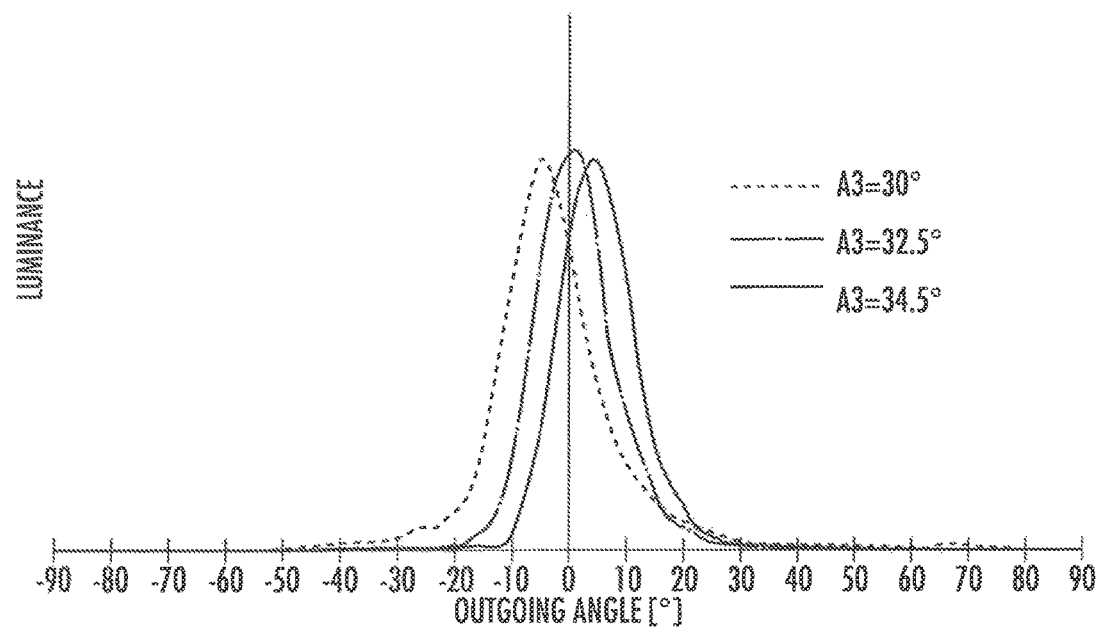

SURFACE LIGHT SOURCE DEVICE AND PRISM SHEET

BACKGROUND OF THE INVENTION

Field of the invention

The present invention relates to a surface light source device and a prism sheet.

Description of the Related Art

In recent years, there has been a growing demand for portable liquid crystal display devices, such as notebook-size personal computers and tablet terminals. In addition, as a surface light source device serving as the backlight of a liquid crystal display device, there is a requirement for a surface light source device capable of switching the distribution of planar illuminating light from the liquid crystal display device according to a user's purpose of use, for example, an application in Which the user uses the liquid crystal display device for business purposes.

As a surface light source device used to switch a light distribution in two steps according to a user's purpose of use, there has been proposed, for example, a surface light source device comprising: a first light source and a second light source; a light guide plate disposed between the first light source and the second light source, the plate including a plurality of lines of prisms extending parallel to one another in the direction of light from the first light source and the second light source on a light-emitting surface and a plurality of concave lines on a light-reflecting surface opposite to the light-emitting surface; and a prism sheet which is arranged on the light-emitting surface of the light guide plate and through which light from the light guide plate is input (see Japanese Patent No. 5254658).

In the surface light source device of Japanese Patent No. 5254658, light from the light guide plate is emitted from the prism sheet by the prisms of the prism sheet as light having strong directivity in the normal direction of a prism sheet emitting surface when the first light source is turned on. Accordingly, the distribution of the luminance of the light emitted from the prism sheet with respect to an outgoing angle is formed into a distribution having one peak at an outgoing angle of approximately 0° when the first light source is turned on. Consequently, only the user positioned in the normal direction of the surface light source device can visually recognize the display of equipment in which the surface light source device is built.

When the first light source and the second light source are simultaneously turned on, the distribution of synthetic light emitted through the prism sheet is formed into a light distribution having a wide outgoing angle. Accordingly, the surface light source device of Japanese Patent No. 5254658 allows the distribution of light emitted from the prism sheet to be switched in two steps by changing the lighting mode of the light sources according to a user's purpose of use.

If the first light source and the second light source are simultaneously turned on in the surface light source device of Japanese Patent No. 5254658, however, in order to obtain a light distribution having a wide outgoing angle, the light distribution is formed into a distribution having three peaks which are local maximum points and bottoms which are local minimum points among adjacent peaks. Accordingly, portions of the surface light source device corresponding to the bottoms are recognized as dark-line portions on a display screen by a user who views a liquid crystal display device mounted with the surface light source device. The surface light source device may therefore cause a degradation in quality that a surface light source has to have.

SUMMARY OF THE INVENTION

An object of the present invention is to provide a surface light source device capable of switching the distribution of the luminance of light with respect to the outgoing angle of planar illuminating light in two steps and suppressing the occurrence of contrasts that can be sensed in planar illuminating light even in the case of a light distribution having a wide outgoing angle, and a prism sheet used in such a surface light source device.

The present inventors have found that in the distribution of planar illuminating light emitted from a surface light source device, the luminance difference between peaks and each bottom present between the peaks can be suppressed by providing the surface light source device with a prism sheet including prisms having a specific shape, and have thus achieved the aforementioned object.

That is, the present invention is a surface light source device comprising a light guide plate formed so that light is input to a pair of side surfaces parallel to each other and emitted from at least one plane; a pair of light sources disposed oppositely to the respective side surfaces of the light guide plate through which the light is input; and a prism sheet disposed oppositely to the plane of the light guide plate from which the light is emitted, wherein the prism sheet includes an incident surface through which light emitted from the light guide plate is input, an emitting surface on the opposite side of the incident surface through which light is emitted from the prism sheet, and a plurality of ridges extending parallel to the side surfaces of the light guide plate between the side surfaces and formed side by side in a direction orthogonal to the side surfaces on the incident surface, the ridges include inclined surfaces extending from the top of each ridge to the sides of adjacent ridges to form a groove between the ridges, one of the inclined surfaces extending from the top of each ridge to the sides of adjacent ridges includes a top-side first inclined surface and a bottom-side second inclined surface different in tilt angle toward the bottom of the groove, an inclination angle A1 of the first inclined surface is within the range of $35.5°≤A1≤39°$, and an inclination angle A2 of the second inclined surface is within the range of $23°≤A2≤30°$, with respect to the normal line of the emitting surface of the prism sheet.

According to the present invention, planar illuminating light having directivity in the normal direction (a direction from the surface light source device toward a person having a visual contact) of the emitting surface of the prism sheet and having a light distribution narrow in outgoing angle is emitted when light source disposed on the side of the first inclined surface and the second inclined surface is turned on. Accordingly, visibility narrow in angle in the horizontal direction of the prism sheet emitting surface on a surface perpendicular to a direction in which the ridges extend can be obtained when the surface light source device is mounted on a liquid crystal display device. It is therefore possible to make it difficult for a bystander, for example, a third party sitting next to read contents displayed on a portable liquid crystal display device, such as a notebook-size personal computer or a tablet terminal.

On the other hand, planar illuminating light having directivity in the normal direction of the emitting surface of the prism sheet, in directions inclined from the normal direction to the first inclined surface and the second inclined surface, and in directions inclined from the normal direction to the opposite side of the first inclined surface and the second inclined surface across a ridge and having a light distribution wide in outgoing angle is emitted when the two light sources are turned on. Accordingly, visibility wide in angle in the horizontal direction of the prism sheet emitting surface on a surface perpendicular to a direction in which the ridges extend can be obtained when the surface light source device is mounted on a liquid crystal display device.

Accordingly, the directivity of the distribution of planar illuminating light from the surface light source device can be varied simply by switching the lighting state of the light sources to select narrow-angle or wide-angle visibility in a liquid crystal display device mounted with the surface light source device.

In addition, the inclination angle A1 of the first inclined surface is within the range of $35.5°≤A1≤39°$ and the inclination angle A2 of the second inclined surface is within the range of $23°≤A2≤30°$, with respect to the normal line of the emitting surface of the prism sheet Consequently, the difference between the luminance of peaks and the luminance of each bottom present between adjacent peaks can be suppressed in the distribution of planar illuminating light emitted from the surface light source device.

If $A1>39°$ or $A2<23°$, the outgoing angle of the planar illuminating light becomes wider as the inclination angle difference between the first inclined surface and the second inclined surface becomes larger. In the light distribution, the difference of the luminance of a bottom between adjacent peaks from the luminance of peaks becomes remarkably large. Accordingly, portions of planar illuminating light from the surface light source device corresponding to the bottoms may be sensed as dark-line portions.

If $A1<35.5°$ or $A2>30°$, the inclination angle difference between the first inclined surface and the second inclined surface becomes smaller and one of two half-value widths decreases to 10° or smaller. Consequently, it is difficult to create planar illuminating light having a uniform, wide outgoing angle even if the two light sources are turned on. Note that "half-value width" refers to an angular width in the normal direction of the emitting surface of the prism sheet in the light distribution, i.e., an angular width from an outgoing angle of 0° to the minimum value (negative value) of the outgoing angle which is half or more than half the luminance of peaks of the light distribution, and an angular width up to the maximum value (positive value) of the outgoing angle.

Accordingly, the surface light source device of the present invention can switch the distribution of the luminance of light in two steps with respect to the outgoing angle of planar illuminating light and suppress the occurrence of contrasts that can be sensed in planar illuminating light from the surface light source device even in the case of a light distribution having a wide outgoing angle.

In the present invention, the ridges are preferably such that a ratio L2/L1 between a length L1 of the first inclined surface and a length L2 of the second inclined surface is within the range of $0.3≤L2/L1≤4$ in a cross-section perpendicular to a direction in which the ridges extend.

Consequently, planar illuminating light having a wide outgoing angle can be created when the two light sources are simultaneously turned on. If $L2/L1<0.3$ or $L2/L1>4$, i.e., if either the length L1 of the first inclined surface or the length L2 of the second inclined surface is larger, one of the two half-value widths decreases to 10° or smaller. Accordingly, visibility wide in angle in the horizontal direction of the prism sheet emitting surface on a surface perpendicular to a direction in which the ridges extend may be difficult to obtain.

In the present invention, the ridges preferably include a first ridge inclined surface including the first inclined surface and the second inclined surface and a second ridge inclined surface on the opposite side of the first ridge inclined surface with respect to the normal line of the emitting surface in a cross-section perpendicular to a direction in which the ridges extend, and an inclination angle A3 of the second ridge inclined surface is preferably within the range of $30°≤A3≤34.5°$ with respect to the normal line of the emitting surface at an intersection point of the normal line of the emitting surface and the second ridge inclined surface.

Consequently, peaks of the luminance f outgoing light in the distribution of planar illuminating light emitted from the emitting surface of the prism sheet are formed near an outgoing angle of 0° when the light source disposed on the side of the first ridge inclined surface is turned on, since the inclination angle A3 of the second ridge inclined surface is within the range of $30°≤A3≤34.5°$.

If $A3<30°$ or $A3>34.5°$, the absolute value of an outgoing angle exceeds 5° with respect to peaks of luminance in the distribution of planar illuminating light. The directivity of planar illuminating light in a direction perpendicular to the prism sheet emitting surface therefore degrades. Consequently, the present invention can securely emit planar illuminating light having directivity in a direction perpendicular to the emitting surface of the prism sheet and having a light distribution narrow in outgoing angle.

The light guide plate of the surface light source device of the present invention is not limited to a single light guide plate but may be formed into a plurality of light guide plates. Specifically, the pair of light sources may include a first light source disposed on the side of the second ridge inclined surface opposite to the first ridge inclined surface including the first inclined surface and the second inclined surface with respect to the normal line of the emitting surface in a cross-section perpendicular to a direction in which the ridges extend and a second light source disposed on the side of the first ridge inclined surface, the light guide plate may include a first light guide plate and a second light guide plate disposed adjacently and parallel to the first light guide plate, the first light source may be located on a side surface of the first light guide plate through which the light is input, the second light source may be located on a side surface of the second light guide plate through which the light is input, and the first light source and the second light source may be formed oppositely to each other with the first light guide plate and the second light guide plate therebetween.

At that time, a half-value angular width θ1 of outgoing light from the first light guide plate is preferably larger than a half-value angular width θ2 of outgoing light from the second light guide plate (θ1>θ2) on a planar surface formed by the normal direction of a planar surface of the first light guide plate through which the light is emitted and the normal direction of a planar surface of the second light guide plate through which the light is emitted and the normal directions of the side surfaces of the first light guide plate and the second light guide plate, from the viewpoint of preventing the occurrence of contrasts that can be sensed in the planar illuminating light from the surface light source device even in the case of the distribution of the planar illuminating light wide in outgoing angle. Note that "half-value angular width" refers to a range of outgoing angles having luminance half or more than half the luminance of peaks of the light distribution.

In the present invention, the prism sheet including an incident surface through which light is input and an emitting surface that emits the input light includes a plurality of ridges formed side by side in one direction on the incident surface, the ridges include inclined surfaces extending from the top of each ridge to adjacent ridges to form a groove between the ridges, one of the inclined surfaces extending from the top of each ridge to adjacent ridges includes a top-side first inclined surface and a bottom-side second inclined surface different in tilt angle toward the bottom of the groove, an inclination angle A1 of the first inclined surface is within the range of $35.5° \leq A1 \leq 39°$ and an inclination angle A2 of the second inclined surface is within the range of $23° \leq A2 \leq 30°$, with respect to the normal line of the emitting surface.

If the prism sheet of the present invention is built in, for example, a surface light source device including a light guide plate formed so that light is input to a pair of side surfaces parallel to each other and light is emitted from at least one plane and a pair of light sources disposed oppositely to the respective side surfaces of the light guide plate through which the light is input, the distribution of the intensity of outgoing light with respect to the outgoing angle of planar illuminating light can be switched in two steps by varying the lighting state of the light sources. In addition, the occurrence of contrasts that can be sensed in planar illuminating light from the surface light source device can be suppressed even in the case of forming a light distribution having a wide outgoing angle by providing the surface light source device with the prism sheet of the present invention.

In addition, the ridges of the prism sheet are preferably such that a ratio L2/L1 between a length L1 of the first inclined surface and a length L2 of the second inclined surface is within the range of $0.3 \leq L2/L1 \leq 4$ in a cross-section perpendicular to a direction in which the ridges extend when the two light sources of the surface light source device are simultaneously turned on, in order to create planar illuminating light having a wide outgoing angle.

Yet additionally, the ridges preferably include a first ridge inclined surface including the first inclined surface and the second inclined surface and a second ridge inclined surface on the opposite side of the first ridge inclined surface with respect to the normal line of the emitting surface in a cross-section perpendicular to a direction in which the ridges extend, and an inclination angle A3 of the second ridge inclined surface is preferably within the range of $30° \leq A3 \leq 34.5°$ with respect to the normal line of the emitting surface at an intersection point of the normal line of the emitting surface and the second ridge inclined surface.

For example, if the light source disposed on the side of the first inclined surface and the second inclined surface of the prism sheet is turned on, peaks of luminance in the distribution of planar illuminating light emitted from the emitting surface of the prism sheet are formed near an outgoing angle of 0°. Consequently, it is possible to securely emit planar illuminating light having directivity in a direction perpendicular to the emitting surface of the prism sheet and having a light distribution narrow in outgoing angle.

BRIEF DESCRIPTION OF THE DRAWINGS

FIG. 4A and FIG. 4B are explanatory views in which FIG. 4A is an explanatory view of courses of light when a first light source is turned on; and FIG. 4B is an explanatory view of a course of light when a second light source is turned on;

FIG. 5 is a graphical view illustrating the luminance distributions of outgoing light with respect to the outgoing angle of planar illuminating light;

FIG. 6A and FIG. 6B are graphical views in which FIG. 6A is a graphical view illustrating light distributions in a case where a ratio L2/L1 between a length L1 of a first inclined surface and a length L2 of a second inclined surface is 0.3, 1.5, and 4; and FIG. 6B is a graphical view illustrating light distributions in a case where the ratio L2/L1 is 0.2 and 5;

FIG. 7A and FIG. 7B are graphical views in which FIG. 7A is a graphical view illustrating light distributions when an inclination angle A1 of the first inclined surface is varied with respect to the normal line of the emitting surface of the prism sheet; and FIG. 79 is a graphical view illustrating light distributions when an inclination angle A2 of the second inclined surface is varied with respect to the normal line of the emitting surface of the prism sheet;

FIG. 8A and FIG. 8B are graphical views in which FIG. 8A is a graphical view illustrating other light distributions when the inclination angle A1 of the first inclined surface is varied with respect to the normal line of the emitting surface of the prism sheet; and FIG. 8B is a graphical view illustrating other light distributions when the inclination angle A2 of the second inclined surface is varied with respect to the normal line of the emitting surface of the prism sheet;

FIG. 9 is a graphical view illustrating light distributions of another planar illuminating light when an inclination angle A3 of a second ridge inclined surface is varied with respect to the normal line of the emitting surface of the prism sheet;

DETAILED DESCRIPTION OF THE PREFERRED EMBODIMENTS

Figure 1:
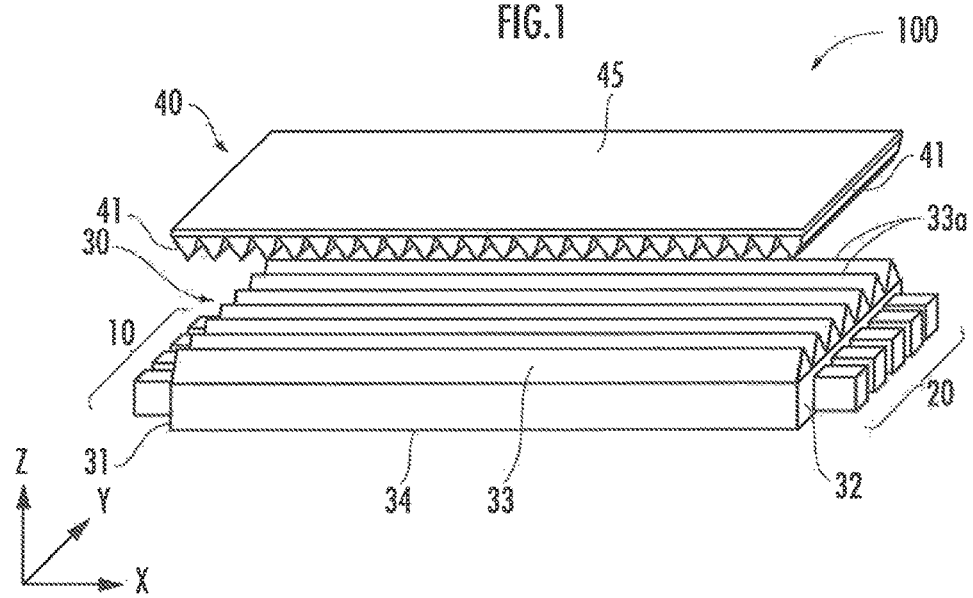
FIG. 1 is a schematic view of a surface light source device of the present embodiment.

The overall configuration of a surface light source device 100 of the present embodiment will be described with reference to FIGS. 1 to 3. The surface light source device 100 of the present embodiment is used as the backlight of a liquid crystal display device. As illustrated in FIG. 1, the surface light source device 100 of the present embodiment comprises a first light source 10, a second light source 20, a light guide plate 30, and a prism sheet 40.

Both the first light source 10 and the second light source 20 are LED arrays in each of which a plurality of LEDs (Light Emitting Diodes) are laid out into a single array. Note that the first light source 10 and the second light source 20 are not limited to LEDs. Alternatively, linear light sources, such as cold-cathode fluorescent tubes or hot-cathode fluorescent tubes, may be used as the light sources.

The first light source 10 and the second light source 20 are turned on by an independent lighting circuit (not illustrated). Note that equipment mounted with a liquid crystal display device using the surface light source device 100 as a backlight, for example, portable electronic equipment, such as notebook-size personal computers, tablet terminals, cellular phones and portable TVs/DVDs, and banking ATM terminals are provided with a light source selecting unit (not illustrated) configured to select which of the first light source 10 and the second light source 20 to turn on. The light source selecting unit is composed of, for example, a changeover switch, a changeover button, or keys allocated to a touch panel, a keyboard or the like under predetermined conditions. The light source selecting unit may be a device to be controlled by a program that automatically selects a light source to be used according to the condition of use of the equipment mounted with a liquid crystal display device.

The light guide plate 30 is a rectangular plate-like light guide plate and formed from a translucent material, such as acrylic resin or polycarbonate resin. The light guide plate 30 comprises a pair of side surfaces 31 and 32 opposed to each other in the longitudinal direction of the light guide plate 30, and a light guide plate emitting surface 33 which is one of thickness-direction surfaces. The side surface 31 and the side surface 32 opposed to the side surface 31 are planar surfaces parallel to each other.

The side surface 31 is structured as a first light guide plate incident surface 31 through which light is input from the first light source 10 into the light guide plate 30. The first light source 10 is disposed, with the longitudinal direction of the first light source 10 aligned with the longitudinal direction of the first light guide plate incident surface 31, so as to face the first light guide plate incident surface 31. Thus, light from the first light source 10 is introduced into the light guide plate 30 through the first light guide plate incident surface 31.

The side surface 32 is structured as a second light guide plate incident surface 32 through which light is input from the second light source 20 into the light guide plate 30. The second light source 20 is disposed, with the longitudinal direction of the second light source 20 aligned with the longitudinal direction of the second light guide plate incident surface 32, so as to face the second light guide plate incident surface 32. Thus, light from the second. light source 20 is introduced into the light guide plate 30 through the second light guide plate incident surface 32.

Figure 2:
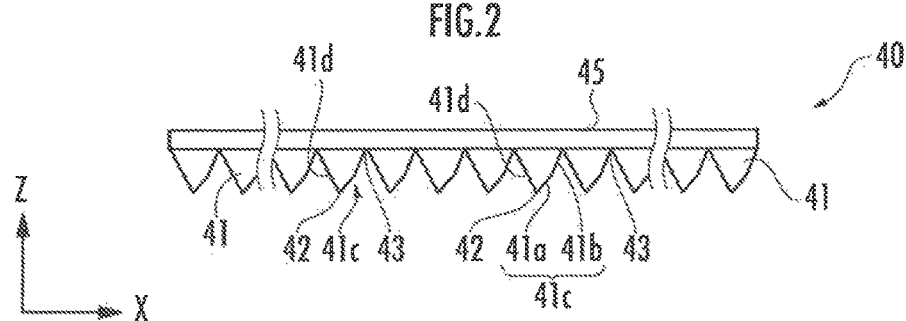
FIG. 2 is a front view of a prism sheet 40 of the present embodiment.
Figure 3:
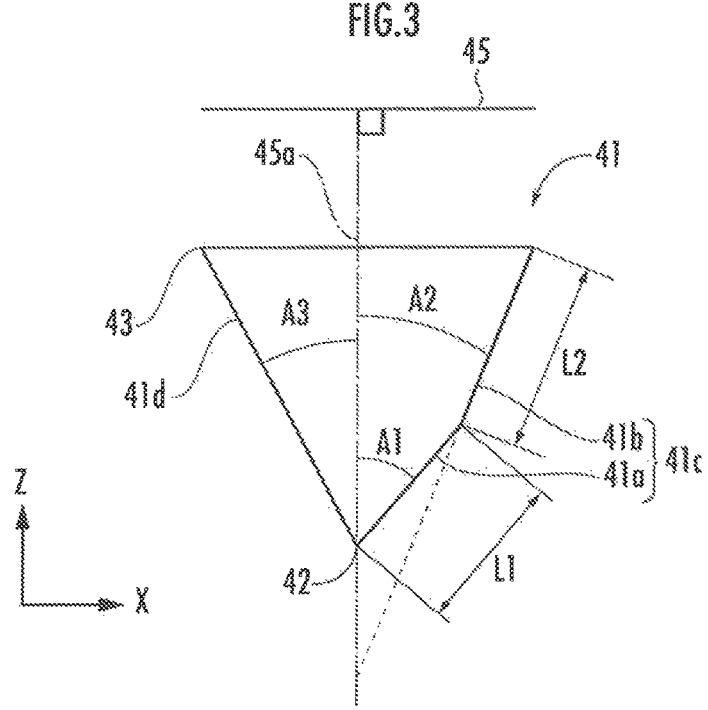
FIG. 3 is an explanatory view of ridges 41 of the prism sheet 40 of the present embodiment.

In the following discussion, a direction perpendicular to the first light guide plate incident surface 31 and the second light guide plate incident surface 32 is defined as an X-axis direction, and two axis directions orthogonal to each other on a planar surface orthogonal to the X-axis direction are defined as a Y-axis direction and a Z-axis direction, as illustrated in FIGS. 1 to 3. The X-axis direction, the Y-axis direction and the Z-axis direction are three axis directions orthogonal to one another, where the Y-axis direction is defined as the longitudinal direction (longitudinal direction of the first light source 10 and the second light source 20) of the first light guide plate incident surface 31 and the second light guide plate incident surface 32, and the Z-axis direction is defined as the thickness direction (latitudinal direction in FIG. 1) of the light guide plate 30.

In connection with the X-axis direction, a direction from the first light guide plate incident surface 31 toward the second light guide plate incident surface 32, i.e., the direction of light introduction from the first light source 10 to the light guide plate 30 is defined as an X-axis positive direction. In connection with the Z-axis direction, a direction from a rear surface 34 toward a front surface 33 of the light guide plate 30 is defined as a Z-axis positive direction.

The thickness-direction front surface (upper surface in FIG. 1) 33 of the light guide plate 30 constitutes the light guide plate emitting surface 33 through which light introduced into the plate is emitted to the prism sheet 40. In addition, the thickness-direction rear surface (lower surface in FIG. 1) 34 of the light guide plate 30 constitutes a light-reflecting surface that reflects light introduced into the plate toward the light guide plate emitting surface 33. The light guide plate front surface 33 which is a light guide plate emitting surface and the light guide plate rear surface 34 are planar surfaces the reference planar surfaces of which are parallel to each other.

In the light guide plate emitting surface 33, a plurality of lines of prisms 33a extending parallel to one another in the X-axis direction are protrudingly and continuously formed in the Z-axis positive direction from the reference planar surfaces. Each prism 33a is a prism the X-axis-direction vertical cross-section, i.e., the cross-section perpendicular to the X-axis of which is substantially isosceles triangular, i.e., a substantially triangular pole-shaped prism extending in the X-axis direction. The prisms 33a are formed integrally with the light guide plate 30 by means of injection molding or the like. The Y-axis-direction width and the vertex angle of each prism 33a are adjusted as appropriate, according to directional characteristics and the like required of the surface light source device.

Note that the X-axis-direction vertical cross-sectional shape of each prism 33a is not limited to a continuous isosceles triangular shape. Alternatively, the cross-sectional shape may be a flat-topped trapezoid shape, a barrel-vaulted shape, or a corrugated shape. Yet alternatively, the prisms 33a may have flat surfaces among prisms having any of these shapes. Still alternatively, the X-axis direction-vertical cross-sectional shape of each prism 33a may vary continuously and homothetically in the Z-axis direction or the Y-axis-direction interval between prisms 33a may not be constant.

In the light guide plate rear surface 34, a plurality of concave lines (not illustrated) linearly extending parallel to one another in the Y-axis direction are concavely and continuously formed in the Z-axis positive direction, in order to direct light from the first light source 10 and the second light source 20 toward the light guide plate emitting surface 33. Concave dots or the like may be formed on the light guide plate rear surface 34, as long as light from the first light source 10 and the second light source 20 can be directed to the light guide plate emitting surface 33.

An unillustrated light-absorbing sheet is disposed on the light guide plate rear surface 34 oppositely to the rear surface, so as to cover the light guide plate rear surface 34. The light-absorbing sheet is a black or grey resin sheet and absorbs light leaking out of the light guide plate 30 from the light guide plate rear surface 34. The light-absorbing sheet prevents reflected and scattered light from once again getting inside the light guide plate 30, causing the direction of light emitted from the light guide plate emitting surface 33 of the light guide plate 30 to the prism sheet 40 to change to an unintended direction. A high-reflectivity sheet may be used in place of the light-absorbing sheet. Although use of a high-reflectivity sheet results in the degradation of directivity due to the effect of light getting inside the light guide plate after leaking out of the plate, the intensity of light emitted for peaks increases. Thus, the high-reflectivity sheet sufficiently satisfies required characteristics in products used in an environment where a surrounding area is bright, for example, products mainly used out of doors.

The prism sheet 40 is a transparent member stacked oppositely and parallel to the light guide plate emitting surface 33, so as to cover the light guide plate emitting surface 33. Examples of the material of the prism sheet 40 include glass and films or sheets of polymer, such as polycarbonate (PC), acrylic, and polyethylene terephthalate (PET).

The prism sheet 40 comprises a planar emitting surface 45 that emits planar illuminating light and a rear surface on the opposite side of the emitting surface 45 in the thickness direction (Z-axis direction) of the prism sheet 40. The prism sheet 40 includes a plurality of ridges 41 extending in parallel with the Y-axis direction (direction parallel to the emitting surface 45 and perpendicular to the normal lines of the light guide plate incident surfaces 31 and 32) and protruding in the Z-axis negative direction on the rear surface on the opposite side of the emitting surface 45 of the prism sheet.

As illustrated in FIG. 3 which is the Y-axis-direction vertical cross-section, i.e., the cross-section perpendicular to the Y-axis, of each ridge 41, each ridge 41 includes a first ridge inclined surface 41c including a planar first inclined surface 41a and a planar second inclined surface 41b in order from a top 42 of each ridge 41 to an adjacent ridge 41 toward a bottom 43 of a groove present between the ridges along the Y-axis direction, and a planar second ridge inclined surface 41d on the opposite side of the first ridge inclined surface 41c with respect to a normal line 45a of the emitting surface 45. Note that the second ridge inclined surface 41d is not limited to a planar surface but may be a curved surface.

The prism sheet 40 including the ridges 41 redirects light from the light guide plate emitting surface 33 and adjusts the direction of planar illuminating light emitted from the emitting surface 45.

The surface light source device 100 is configured by assembling the first and second light sources 10 and 20 onto the side edges of the light guide plate incident surfaces 31 and 32, respectively, with the light-absorbing sheet superposed on the light guide plate rear surface 34 of the light guide plate 30, and then assembling the light guide plate 30 into the interior of a framework with the prism sheet 40 superposed on the light guide plate emitting surface 33 of the light guide plate 30.

Then, a liquid crystal panel that displays images by controlling planar illuminating light from the surface light source device 100 is oppositely disposed on the prism sheet 40, and thus, the surface light source device 100 is used as the backlight of a liquid crystal display device.

Next, the operation of the surface light source device 100 of the present embodiment will be described.

[First Light Source Lighting State]

In the case of a first light source lighting state in which the first light source 10 is turned on, light introduced from the first light source 10 to the light guide plate 30 through the light guide plate incident surface 31 is first reflected by a plurality of unillustrated concave lines of the light guide plate rear surface 34, and then input to the light guide plate emitting surface 33 at a similar angle.

Figure 4A:
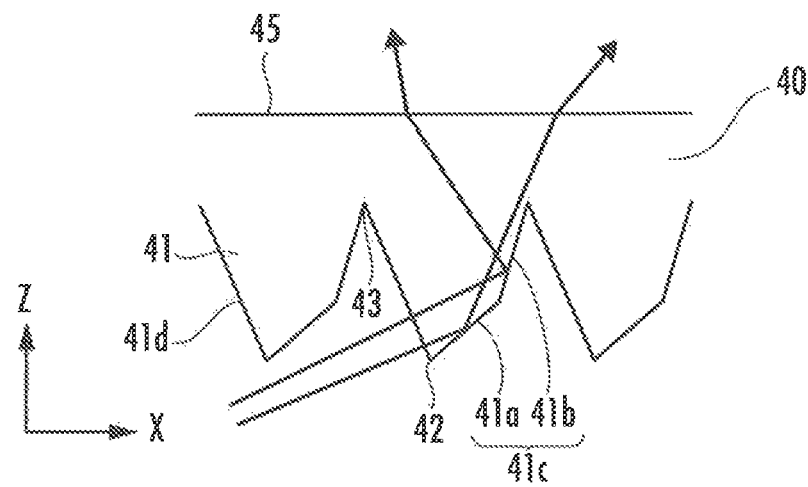

Next, part of the light input to the light guide plate emitting surface 33 is introduced from the light guide plate emitting surface 33 to the prism sheet 40, reflected by the first ridge inclined surface 41c, and emitted from the emitting surface 45. FIG. 4A shows the courses of part of the light introduced from the first light source 10 to the light guide plate 30 in the prism sheet 40 by solid lines when the first light source 10 is turned on.

In the case of the first light source lighting state, part of light introduced from the light guide plate 30 to the prism sheet 40 is reflected by the first inclined surface 41a of each ridge 41 and another part of the light is reflected by the second inclined surface 41b of each ridge 41, as illustrated in FIG. 4A. Yet additionally, these parts of the light become refracted by the emitting surface 45 to veer to directions inclined toward the X-axis positive and negative directions. Accordingly, light output from the emitting surface 45 is emitted in directions inclined from the normal line 45a of the emitting surface 45 toward the X-axis positive and negative directions.

[Second Light Source Lighting State]

In the case of a second light source lighting state in which the second light source 20 is turned on, light introduced from the second light source 20 to the light guide plate 30 through the light guide plate incident surface 32 is first reflected by a plurality of unillustrated concave lines of the light guide plate rear surface 34, and then input to the light guide plate emitting surface 33 at a similar angle, as in the first light source lighting state.

Figure 4B:
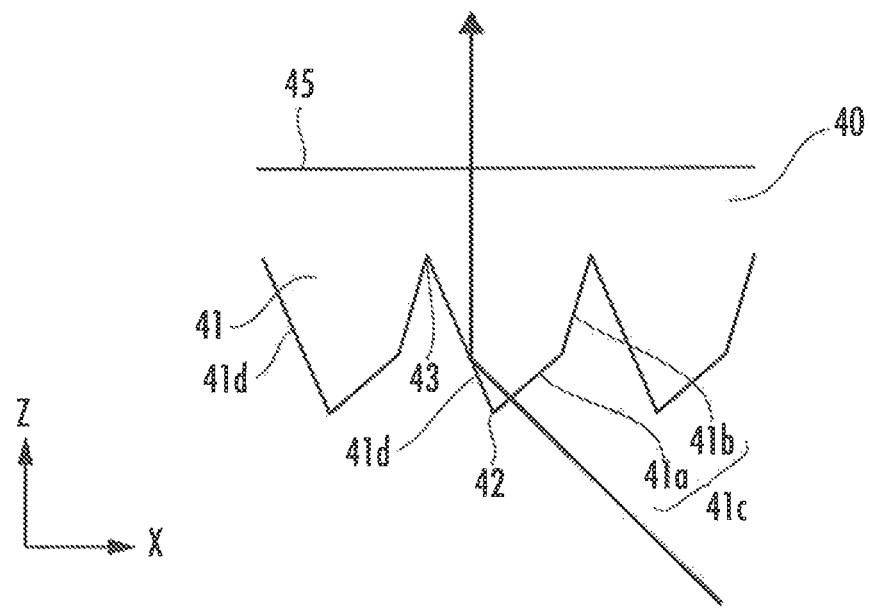

Next, part of the light input to the light guide plate emitting surface 33 is introduced from the light guide plate emitting surface 33 to the prism sheet 40, reflected by the second ridge inclined surface 41d, and emitted from the emitting surface 45. FIG. 4B shows the course of part of the light introduced from the second light source 20 to the light guide plate 30 in the prism sheet 40 by a solid line when the second light source 20 is turned on.

In the case of the second light source lighting state, part of light introduced from the light guide plate 30 to the prism sheet 40 is reflected by the second inclined surface 41d of each ridge 41 and becomes refracted by the emitting surface 45 to veer to the Z-axis positive direction, as illustrated in FIG. 4B. Accordingly, a light distribution having directivity narrowly limited in the normal direction of the emitting surface 45, i.e., in the Z-axis positive direction can be obtained for light emitted from the emitting surface 45.

[Simultaneous Lighting State]

In the case of a simultaneous lighting state in which the first light source 10 and the second light source 20 are turned on light emitted from the emitting surface 45 is synthetic light including light emitted from the emitting surface 45 in the first light source lighting state and light emitted from the emitting surface 45 in the second light source lighting state. Accordingly, a distribution of light emitted in directions inclined from the normal line 45a of the emitting surface 45 toward the X-axis positive and negative directions, i.e., a distribution of light having a wide range of outgoing angles can be obtained for light emitted from the emitting surface 45.

FIG. 5 illustrates the results of simulation in a case Where a ratio L2/L1 between a length L1 of the first inclined surface 41a and a length L2 of the second inclined surface 41b is 1.5 in the vertical cross-section of each ridge 41 in the extending direction (Y-axis direction) thereof. In FIG. 5, the luminance distributions of outgoing light with respect to an outgoing angle in the first light source lighting state, the second light source lighting state and the simultaneous lighting state are shown by a dashed line, a solid line and a single-dot chain line, respectively.

Note that the outgoing angle refers to an angle of inclination of light emitted from the emitting surface 45 from the Z-axis positive direction. The state of the outgoing angle being positive means that light is emitted while being inclined from the Z-axis positive direction toward the second light source 20. In contrast, the state of the outgoing angle being negative means that light is emitted while being inclined from the Z-axis positive direction toward the first light source 10.

From FIG. 5, it is understood that a distribution having peaks near outgoing angles of −10° and 15° is formed in the case of the first light source lighting state (dashed line). It is also understood that a distribution having a peak near an outgoing angle of 0°, i.e., a distribution having directivity narrowly limited in the Z-axis positive direction is formed in the case of the second light source lighting state (solid line). In addition, it is understood that a distribution having a range of outgoing angles as wide as −30° to 30° is formed in the case of the simultaneous lighting state (single-dot chain line).

Accordingly, a light distribution having extremely strong directivity can be formed by turning on the second light source 20 only. In addition, a light distribution having a wide outgoing angle can be formed by simultaneously turning on the first light source 10 and the second light source 20.

If the first light source 10 and the second light source 20 are simultaneously turned on, luminance differences between P1 and B1 and between P3 and B2 become smaller with respect to bottoms B1 and B2 which are local minimal points adjacent respectively to outer peaks P1 and P3, among peaks P1, P2 and P3 which are three local maximum points of a light distribution. Consequently, according to the surface light source device 100, it is possible to obtain a natural light distribution in which dark-line portions are less likely to be recognized on the display screen of a liquid crystal display device mounted with the surface light source device 100, even in the case of a light distribution having a wide outgoing angle.

Figure 6A:
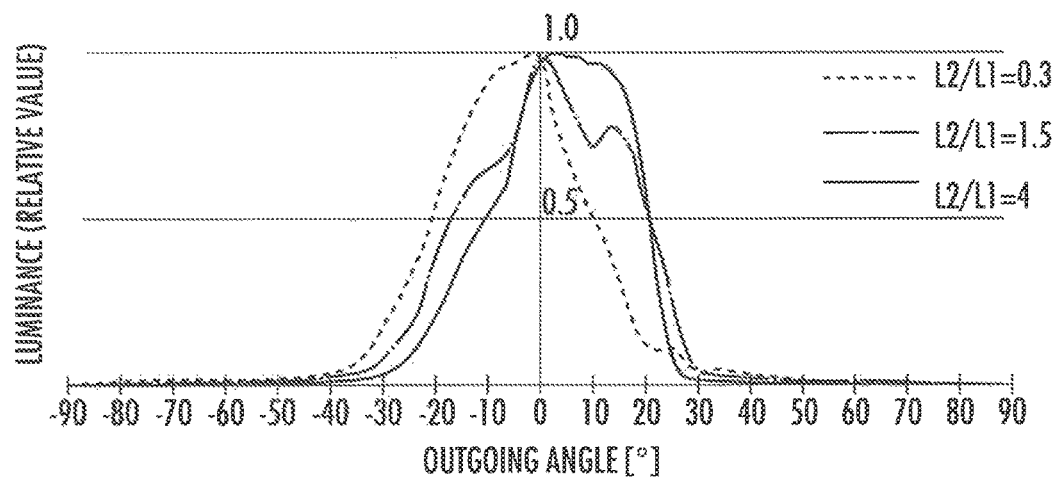

In a vertical cross-section of each ridge 41 in the extending direction (Y-axis direction) thereof, the ratio L2/L1 between the length L1 of the first inclined surface 41a and the length L2 of the second inclined surface 41b is preferably within the range of 0.3≤L2/L1≤4. FIG. 6A illustrates light distributions, by a dashed line, a single-dot chain line and a solid line, in which values of the ratio L2/L1 are 0.3, 1.5 and 4, respectively. As illustrated in FIG. 6A, planar illuminating light having a wide outgoing angle is created if the first light source 10 and the second light source 20 are simultaneously turned on.

Figure 6B:
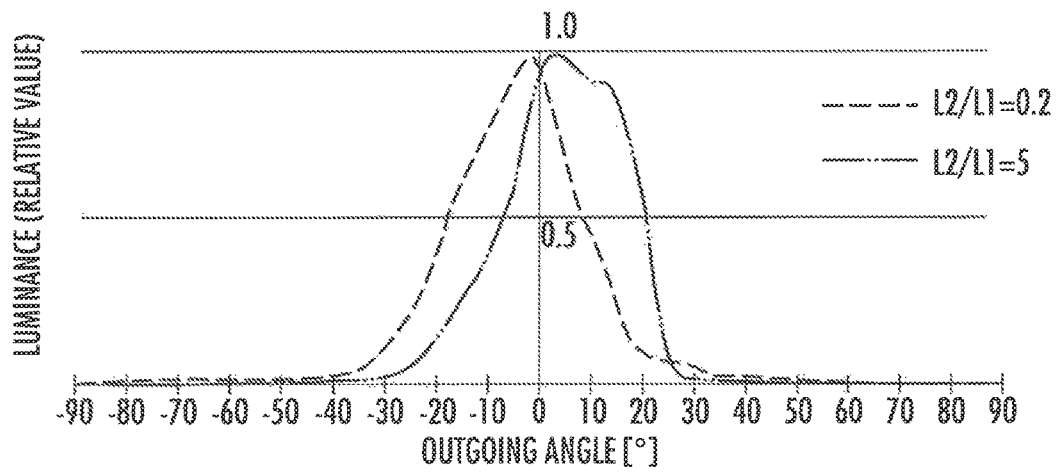

FIG. 6B illustrates light distributions, by a dashed line and a double-dot chain line, in which values of the ratio L2/L1 are 0.2 and 5, respectively. As illustrated in FIG. 6B, if L2/L1<0.3 or L2/L1>4, i.e., if a ratio between the length L1 of the first inclined surface and the length L2 of the second inclined surface becomes larger, for example, L2/L1=0.2, the half-value width equals 17.3° (negative-value side) and 8.0° (positive-value side). If L2/L1=5, the half-value width equals 7.3° (negative-value side) and 20.6° (positive-value side). Thus, one of two half-value widths is 10° or smaller. Consequently, it may be difficult to obtain visibility uniform and wide in the X-axis positive and negative directions (horizontal directions in a plane perpendicular to the extending direction (Y-axis direction) of each ridge 41).

In a vertical cross-section of each ridge 41 in the extending direction (Y-axis direction) thereof, the inclination angle A1 of the first inclined surface 41a is preferably within the range of 35.5°≤A1≤39° and the inclination angle A2 of the second inclined surface 41b is preferably within the range of 23°≤A2≤30°, with respect to the normal line 45a of the emitting surface 45.

Figure 7A:
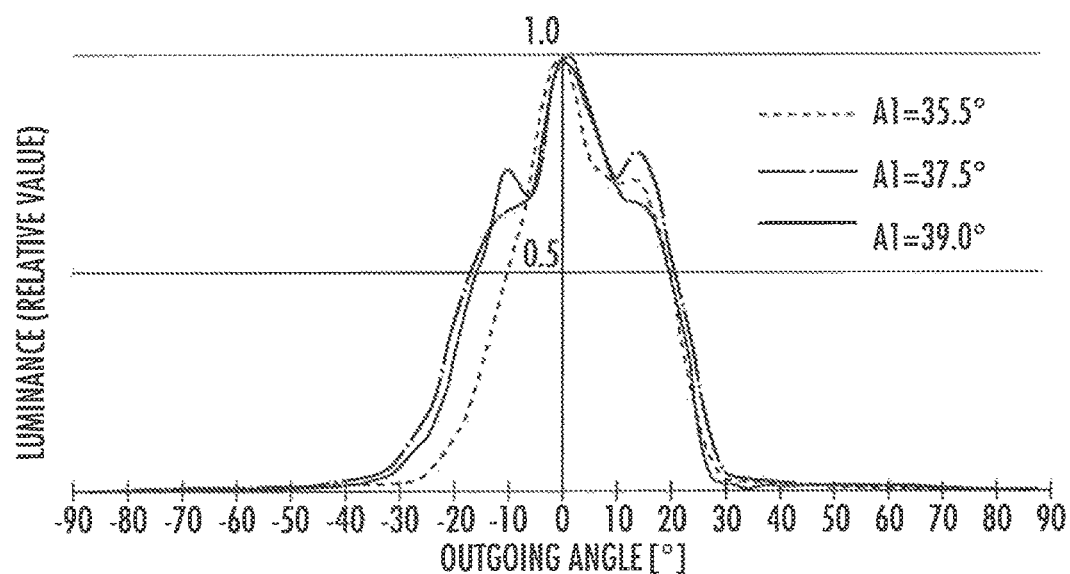

FIG. 7A illustrates light distributions, by a dashed line, a single-dot chain line and a solid line, in which (A1, A2, L2/L1) equals (35.5°, 26.5°, 1.5), (37.5°, 26.5°, 1.5) and (39.0°, 26.5°, 1.5), respectively. In addition, FIG. 7B illustrates light distributions, by a dashed line, a single-dot chain line and a solid line, in which, (A1, A2, L2/L1) equals (37.5°, 23.0°, 1.5), (37.5°, 26.5°, 1.5) and (37.5°, 30°, 1.5), respectively.

Figure 7B:
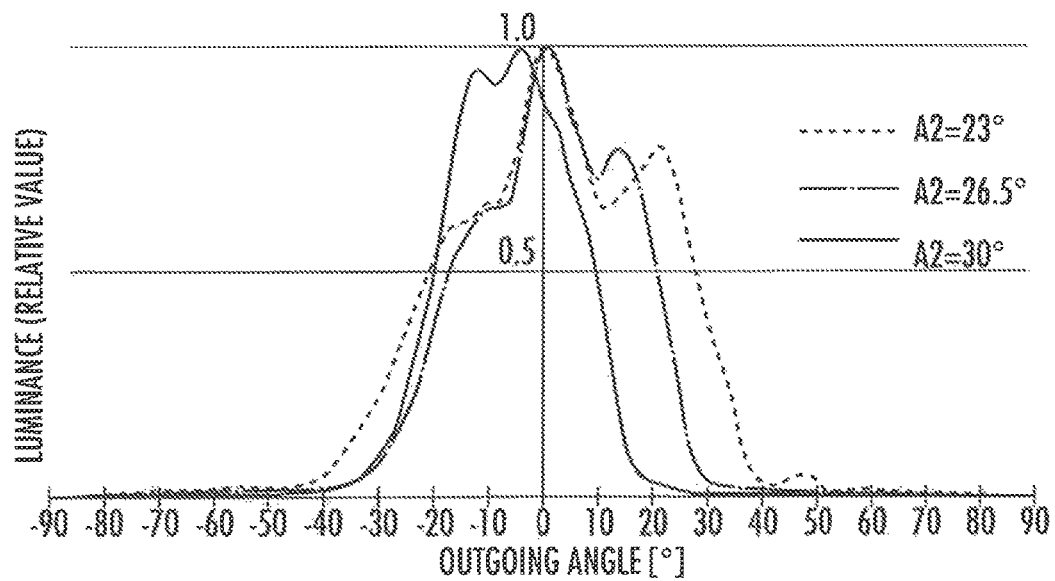

As illustrated in FIGS. 7A and 7B, if the inclination angle A1 is within the range of 35.5°≤A1≤39° and the inclination angle A2 is within the range of 23°≤A2≤30°, the luminance difference of a local minimum point from an adjacent local maximum point can be suppressed even if any local minimum points may or may not exist. Consequently, it is possible to obtain a natural light distribution in which dark-line portions are less likely to be recognized on the display screen of a liquid crystal display device mounted with the surface light source device 100, even in the case of a light distribution having a wide outgoing angle.

FIG. 8A illustrates light distributions, by a dashed line and a single-dot chain line, in which (A1, A2, L2/L1) equals (35.0°, 26.5°, 1.5) and (39.5°, 26.5°, 1.5), respectively. In addition, FIG. 8B illustrates light distributions, by a dashed line and a single-dot chain line, in which (A1, A2, L2/L1) equals (37.5°, 22.5°, 1.5) and (37.5°, 31°, 1.5), respectively.

As illustrated in FIGS. 8A and 8B, if A1>39° or A2<23°, the light distributions become wider in outgoing angle as the difference of an inclination angle between the first inclined surface 41a and the second inclined surface 41b becomes larger. However, the luminance difference between a local minimum point and a local maximum point adjacent to the local minimum point becomes remarkably larger. Consequently, portions of planar illuminating light from the surface light source device 100 corresponding to the local minimum points of luminance may be sensed as dark-line portions.

If A1<35.5° or A2>30°, the difference of an inclination angle between the first inclined surface 41a and the second inclined surface 41b becomes smaller. Accordingly, if, for example, A1=35.0°, the half-value width equals 10° (negative-value side) and 18.7° (positive-value side). If A2=31°, the half-value width equals 20° (negative-value side) and 8.0° (positive-value side). Thus, one of two half-value widths is 10° or smaller. Consequently, it is difficult to create planar illuminating light having a uniform, wide outgoing angle even if the first light source 10 and the second light source 20 are simultaneously turned on.

The inclination angle A3 of the second ridge inclined surface 41d is preferably within the range of 30°≤A3≤34.5° with respect to the normal line 45a of the emitting surface 45 at an intersection point of the normal line 45a of the emitting surface 45 and the second ridge inclined surface 41d in a vertical cross-section of each ridge 41 in the extending direction (Y-axis direction) thereof.

FIG. 9 illustrates light distributions, by a dashed line, a single-dot chain line and a solid line, in which the angle A3 equals 30°, 32.5° and 34.5°, respectively. As illustrated in FIG. 9, if the angle A3 is within the range of 30°≤A3≤34.5°, peaks of luminance of the distributions of planar illuminating light emitted from the emitting surface 45 are formed near an outgoing angle of 0° when the second light source 20 (light source located on the first ridge inclined surface 41c side) is turned on. Accordingly, light with a distribution having directivity narrowly limited in the normal direction (Z-axis direction) of the emitting surface 45 is emitted from the emitting surface 45.

In addition, as is understood from FIG. 9, peaks of luminance of the light distributions exceed an outgoing angle of ±5° if A3<30° or A3>34.5°. Accordingly, light with a distribution having directivity degraded in the normal direction (Z-axis direction) of the emitting surface 45 is emitted from the emitting surface 45.

Figure 10:
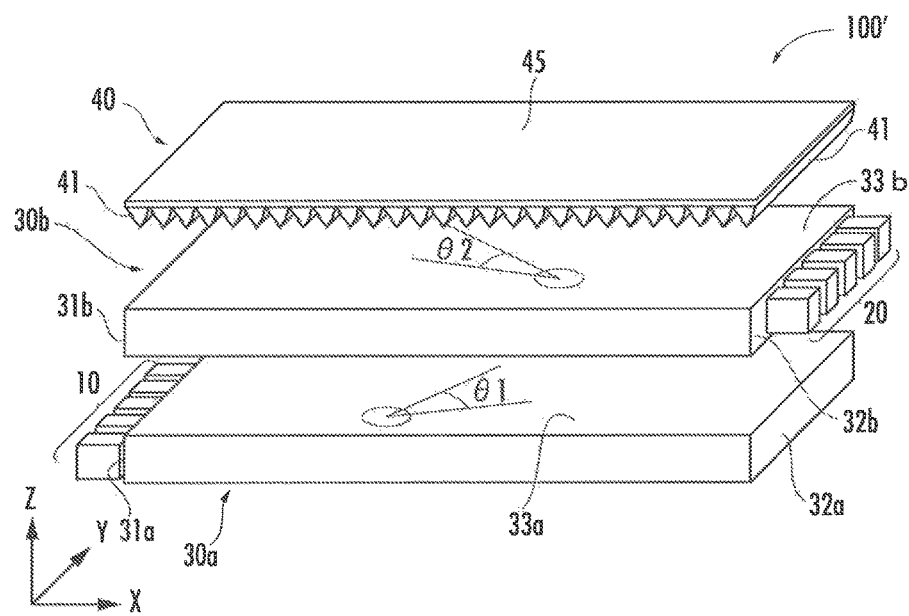
FIG. 10 is a schematic view of a surface light source device of another embodiment.

Note that the light guide plate is not limited to a single light guide plate but may be formed into a plurality of light guide plates. FIG. 10 illustrates a surface light source device 100' of another embodiment. Note that prisms and concave lines arranged on the thickness-direction surfaces of light guide plates 30a and 30b are excluded from FIG. 10. Hereinafter, only the differences of the surface light source device 100' from the surface light source device 100 will be described.

The surface light source device 100' comprises a first light source 10, a second light source 20, light guide plates 30a and 30b, and a prism sheet 40. The side surface 31a of side surfaces 31a and 32a of the light guide plate 30a is structured as an incident surface 31a of the light guide plate 30a through which light is input from the first light source 10 into the light guide plate 30a. The first light source 10 is disposed, with the longitudinal direction of the first light source 10 aligned with the longitudinal direction of the incident surface 31a of the light guide plate 30a, so as to face the incident surface 31a.

Thus, light from the first light source 10 is introduced into the light guide plate 30a through the incident surface 31a.

The side surface 32b of side surfaces 31b and 32b of the light guide plate 30b is structured as an incident surface 32b of the light guide plate 30b through which light is input from the second light source 20 into the light guide plate 30b. The second light source 20 is disposed, with the longitudinal direction of the second. light source 20 aligned with the longitudinal direction of the incident surface 32b of the light guide plate 30b, so as to face the incident surface 32b. Thus, light from the second light source 20 is introduced into the light guide plate 30b through the incident surface 32b.

In addition, the surface light source device 100' is configured such that a half-value angular width θ1 of outgoing light from the light guide plate 30a is larger than a half-value angular width θ2 of outgoing light from the light guide plate 30b, i.e., θ1>θ2, on a planar surface (Y-axis-direction vertical planar surface) formed by: the normal direction of a planar surface 33a of the light guide plate 30a from which the light is emitted and the normal direction of a planar surface 33b of the second light guide plate 30b through which the light is emitted; and the normal directions of the side surfaces 31a, 32a, 31b and 32b of the light guide plate 30a and the light guide plate 30b, from the viewpoint of preventing the occurrence of contrasts that can be sensed in the planar illuminating light even in the case of the distribution of the planar illuminating light wide in outgoing angle.

Figure 11:
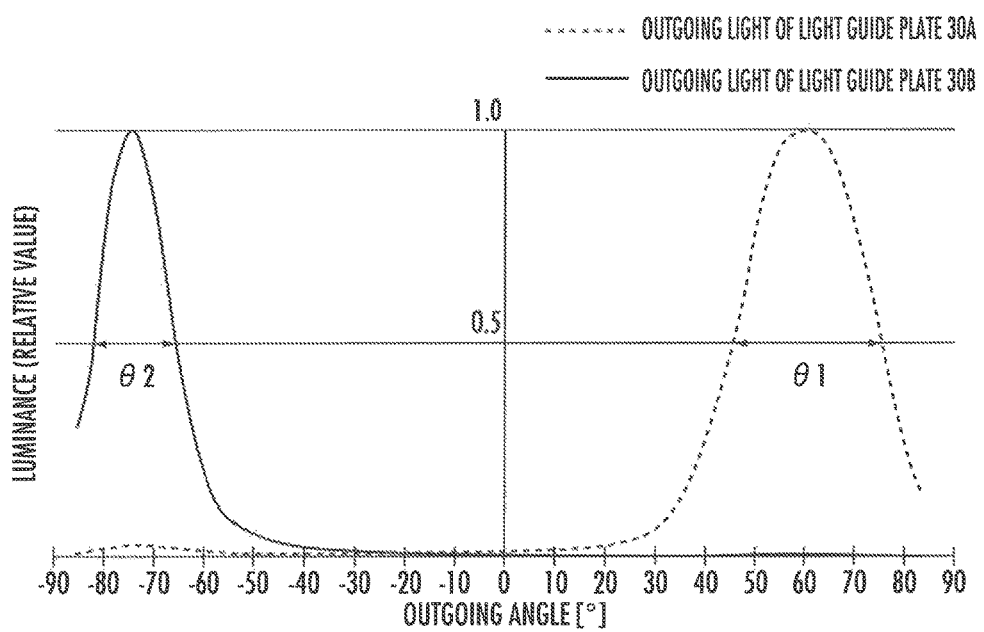
FIG. 11 is an explanatory view of light emitted from each light guide plate of the another embodiment of FIG. 10.

As illustrated in FIG. 11, light emitted from the planar surface 33b of the light guide plate 30b, after being output with a half-value angular width of θ2, passes through the course shown in FIG. 4B and is emitted from the emitting surface 45 with the emission characteristics shown by a solid line in FIG. 5. If the half-value angular width θ2 widens at this time, the half-value angular width of outgoing angle shown by a solid line in FIG. 5 also widens. Accordingly, in order to obtain strong directivity (narrow visibility), θ2 is desired to be a narrow half-value angular width.

As illustrated in FIG. 11, light emitted from the planar surface 33a of the light guide plate 30a, after being output with a half-value angular width of θ1, passes through the course shown in FIG. 4A and forms light distributions separated from each other in directions opposed with respect to the normal direction of the emitting surface shown by a dashed line in FIG. 5.

If θ2>θ1 at this time, i.e., if the light has emission characteristics in which the half-value angular width θ1 is smaller than θ2, the separate light distributions having two peaks change to distributions having narrow half-value angular widths for the two peaks. Consequently, in the simultaneous lighting state, a light distribution having three peaks has narrow half-value angular widths for the three peaks, thus causing the difference between peaks and bottoms to become larger in the light distribution.

Accordingly, in order to maintain strong directivity, narrow visibility characteristics and the prevention of the occurrence of contrasts are realized by maintaining the half-value angular width θ2 shown in FIG. 11 at a narrow half-value angular width and setting the widths as θ1>θ2, i.e., widening θ1 than the half-value angular width θ2.

As illustrated in FIG. 11, if the half-value angular width θ1 of light emitted from the planar surface 33a of the light guide plate 30a is 30.0° when the first light source 10 is turned on and the half-value angular width θ2 of light emitted from the planar surface 33b of the light guide plate 30b is 15.9° when the second light source 20 is turned on, then θ1>θ2 holds true. Consequently, the occurrence of contrasts that can be sensed in planar illuminating light is suppressed even in the case of a distribution of planar illuminating light having a wide outgoing angle.

What is claimed is:

1. A surface light source device comprising:
   a light guide plate formed so that light is input to a pair of side surfaces parallel each other and emitted from at least one plane;
   a pair of light sources disposed oppositely to the respective side surfaces of the light guide plate through which the light is input; and
   a prism sheet disposed oppositely to the plane of the light guide plate from which the light is emitted,
   wherein the prism sheet includes an incident surface through which light emitted from the light guide plate is input, an emitting surface on the opposite side of the incident surface through which light is emitted from the prism sheet, and a plurality of ridges extending parallel to the side surfaces of the light guide plate and formed side by side in a direction orthogonal to the side surfaces on the incident surface, the ridges include inclined surfaces extending from the top of each ridge to the sides of adjacent ridges to form a groove between the ridges, one of the inclined surfaces extending from the top of each ridge to the sides of adjacent ridges includes a top-side first inclined surface and a bottom-side second inclined surface different in tilt angle toward the bottom of the groove, an inclination angle A1 of the first inclined surface is within the range of $35.5°≤A1≤39°$, and an inclination angle A2 of the second inclined surface is within the range of $23°≤A2≤30°$, with respect to the normal line of the emitting surface of the prism sheet.

2. The surface light source device according to claim 1, wherein the ridges are such that a ratio L2/L1 between a length L1 of the first inclined surface and a length L2 of the second inclined surface is within the range of $0.3≤L2/L1≤4$ in a cross-section perpendicular to a direction in which the ridges extend.

3. The surface light source device according to claim 1, wherein the ridges include a first ridge inclined surface including the first inclined surface and the second inclined surface and a second ridge inclined surface on the opposite side of the first ridge inclined surface with respect to the normal line of the emitting surface in a cross-section perpendicular to a direction in which the ridges extend, and an inclination angle A3 of the second ridge inclined surface is within the range of $30°≤A3≤34.5°$ with respect to the normal line of the emitting surface at an intersection point of the normal line of the emitting surface and the second ridge inclined surface.

4. The surface light source device according to claim 1, wherein the pair of light sources include a first light source disposed on the side of the second ridge inclined surface opposite to the first ridge inclined surface including the first inclined surface and the second inclined surface with respect to the normal line of the emitting surface in a cross-section perpendicular to a direction in which the ridges extend and a second light source disposed on the side of the first ridge inclined surface, the light guide plate includes a first light guide plate and a second light guide plate disposed adjacently and parallel to the first light guide plate, the first light source is located on a side surface of the first light guide plate through which the light is input, the second light source is located on a side surface of the second light guide plate through which the light is input, and the first light source and the second light source are opposed to each other with the first light guide plate and the second light guide plate therebetween.

5. The surface light source device according to claim 4, wherein a half-value angular width $\theta 1$ of outgoing light from the first light guide plate is larger than a half-value angular width $\theta 2$ of outgoing light from the second light guide plate ($\theta 1 > \theta 2$) on a planar surface formed by the normal direction of a planar surface of the first light guide plate through which the light is emitted and the normal direction of a planar surface of the second light guide plate through which the light is emitted and the normal directions of the side surfaces of the first light guide plate and the second light guide plate.

6. A prism sheet including an incident surface through which light is input and an emitting surface that emits the input light, the prism sheet comprising a plurality of ridges formed side by side in one direction on the incident surface, the ridges include inclined surfaces extending from the top of each ridge to adjacent ridges to form a groove between the ridges, one of the inclined surfaces extending from the top of each ridge to adjacent ridges includes a top-side first inclined surface and a bottom-side second inclined surface different in tilt angle toward the bottom of the groove, an inclination angle A1 of the first inclined surface is within the range of $35.5° \leq A1 \leq 39°$ and an inclination angle A2 of the second inclined surface is within the range of $23° \leq A2 \leq 30°$, with respect to the normal line of the emitting surface.

7. The prism sheet according to claim 6, wherein the ridges are such that a ratio L2/L1 between a length L1 of the first inclined surface and a length L2 of the second inclined surface is within the range of $0.3 \leq L2/L1 \leq 4$ in a cross-section perpendicular to a direction in which the ridges extend.

8. The prism sheet according to claim 6, wherein the ridges include a first ridge inclined surface including the first inclined surface and the second inclined surface and a second ridge inclined surface on the opposite side of the first ridge inclined surface with respect to the normal line of the emitting surface in a cross-section perpendicular to a direction in which the ridges extend, and an inclination angle A3 of the second ridge inclined surface is within the range of $30° \leq A3 \leq 34.5°$ with respect to the normal line of the emitting surface at an intersection point of the normal line of the emitting surface and the second ridge inclined surface.

* * * * *